April 20, 1965 W. G. WADEY 3,179,810

INFRARED RECORD READER WITH FLUID SIGNAL OUTPUT

Filed Oct. 4, 1961 2 Sheets-Sheet 1

INVENTOR
WALTER G. WADEY

BY Griffin and Stokes
ATTORNEYS

INFRARED RECORD READER WITH FLUID SIGNAL OUTPUT

Filed Oct. 4, 1961 2 Sheets-Sheet 2

3,179,810
INFRARED RECORD READER WITH FLUID SIGNAL OUTPUT

Walter Geoffrey Wadey, Wynnewood, Pa., assignor to Sperry Rand Corporation, New York, N.Y., a corporation of Delaware Filed Oct. 4, 1961, Ser. No. 142,891
30 Claims. (Cl. 250—219)

The present invention generally relates to means for sensing the presence of a mark on a carrier member, and more particularly, to apparatus for producing a change in the pressure of an enclosed fluid system in response to the detection of said mark.

A rapidly developing area in the field of digital data processing systems is the use of pure fluid amplifiers for the transmission and manipulation of information pulses in a fluid medium. As with electronic data processing systems, peripheral input equipment usually is provided to enable the loading of information into the system for processing thereby. Such equipment has consisted of punched card readers, magnetic tape machines and the like, wherein the information contained on the storage medium activates a transducer for conversion into electrical energy. However, in fluid data processing systems, the stored information must be eventually converted into the form of pulses traveling through the working fluid medium. Therefore, in order to reduce the number of energy transducers required, it is highly desirable to have an input system whereby the stored information can be converted directly to such pulse energy without need for any intermediate energy conversion steps.

It is therefore an object of the present invention to provide means whereby information marks contained on a record carrier member can be converted directly into a fluid pulse signal.

Generally, the marked card reader disclosed herein is based on the so-called Golay cell commonly used in infrared research. Such a cell indicates the change in infrared radiation by change in pressure of a small, enclosed volume of gas or other working fluid. Therefore, by detecting a change in the infrared radiation transmitted from a marked card due to the presence of a mark thereon, the Golay cell is here used to convert such change directly into a change in pressure which can be utilized in a fluid data processing system of the type described above.

It is therefore another object of the present invention to provide a marked card reader utilizing an infrared radiation detector.

Another object of the present invention is to provide a marked card reader utilizing infrared radiation scanning means to detect the presence of a mark on a carrier member in the form of a perforation.

A yet further object of the present invention is to provide a reader for an information bearing carrier member wherein a mark has an infrared coefficient of reflection differing from that of the carrier member such that its presence may be sensed by a transducer directly converting a change in infrared radiation into a change of fluid pressure.

A correlative feature of the present invention is the reduction in size of the reader as compared to other reading devices for the same amount of information to be read. Conversely, it can also accommodate increased information density per unit length of area for the same size reader as compared to other reading devices. Although the reader is disclosed as being used for sensing an information bearing record member, the detection principle disclosed herein may also be employed for detecting holes or other suitable markings in webs or sheets of material.

Therefore, it is another object of the present invention to provide means utilizing infrared radiation and a pressure producing detector thereof for sensing the presence of marks on a carrier member.

These and other objects of the present invention will become apparent during the course of the following description, which is to be taken in conjunction with the drawings, in which.

Figures 1, 2, 3:
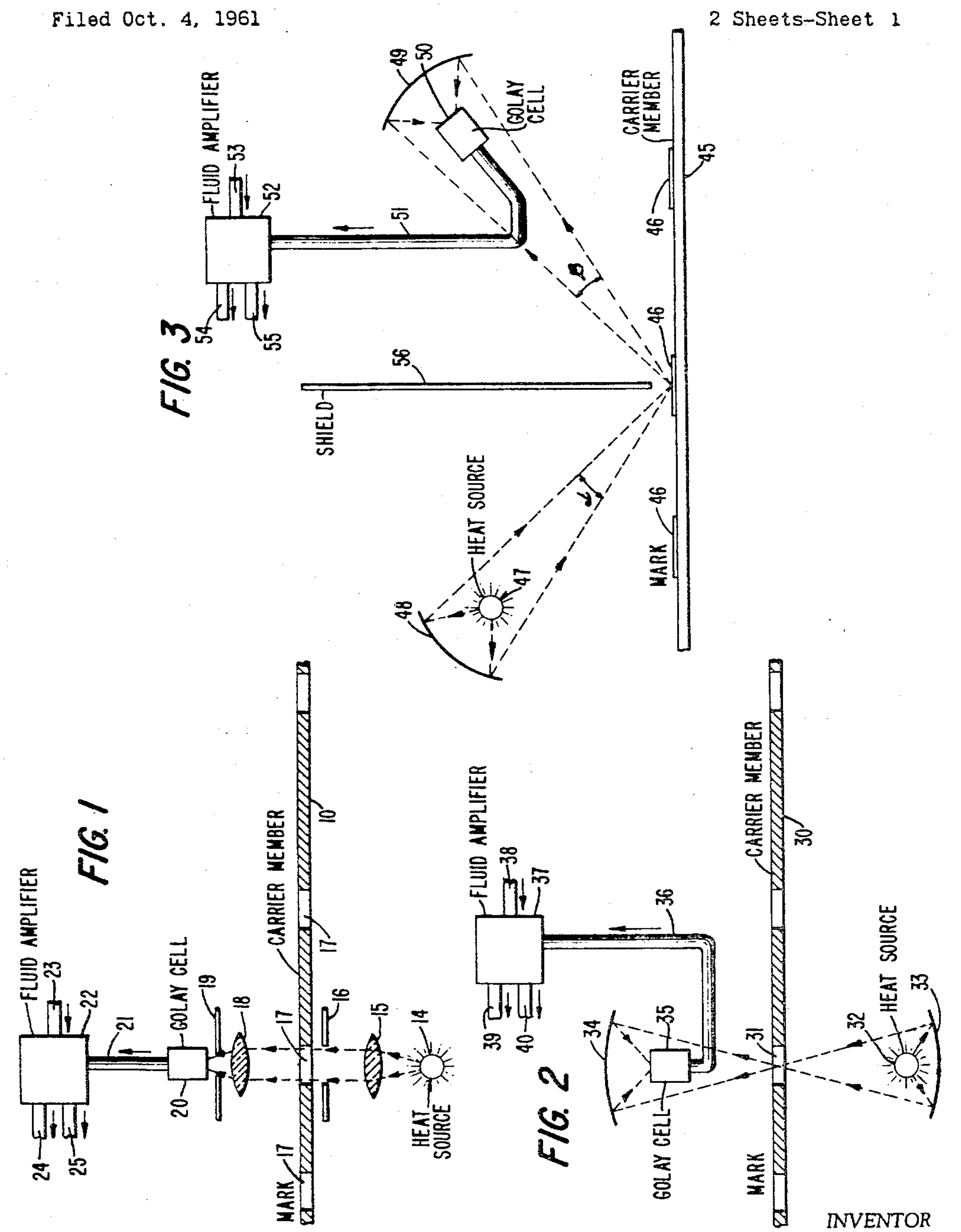
FIGURE 1 is a diagrammatic view of the invention as used to sense the presence of holes in a carrier member.
FIGURE 2 is a diagrammatic representation of a modification of the hole sensing device of FIGURE 1.
FIGURE 3 is a diagrammatic representation of the invention as used in sensing marks by means of reflection of radiation therefrom.
Figure 4:
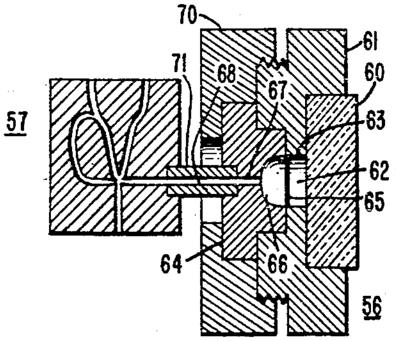
FIGURE 4 is a sectional view of the infrared detector and a pure fluid amplifier.

Referring first to FIGURE 1, there is shown a diagrammatic representation of one embodiment of the invention which illustrates the novel principles and features thereof. A portion of a carrier member 10 is shown in section wherein marks 17 are in the form of perforations or holes therethrough. A scanning system for detecting the presence of a mark on carrier member 10 is generally comprised of the following elements. Positioned on one side of carrier member 10 is a source of infrared radiation 14 which may, for example, be an incandescent solid or some other like heat source. The infrared radiation from source 14 is focused upwards by an optical system comprised of a condensing lens 15 and an aperture 16 which together collimate the radiation from source 14 into a beam having a cross sectional area approximately equal to the area of a perforation in member 10. This beam passes across the space where member 10 is located or through which the member may pass if it is transported by means not shown in FIGURE 1. Upon a mark 17 becoming aligned with the infrared beam, said beam passes therethrough and impinges on the remainder of the optical sensing system comprised of a second condensing lens 18 and aperture 19. Lens 18 and aperture 19 focus the transmitted radiation upon the input of an infrared detector of the type in which a change in the radiation incident thereon produces a pressure change in an enclosed fluid system. Detector 20 may therefore be of the type disclosed in U.S. Patent No. 2,557,096 which is hereinafter referred to as a Golay cell. Certain details of this cell are shown in FIGURE 4 subsequently to be discussed. The output signal of detector 20 is in the form of a pressure change which is conducted via conduit 21 to the control input of a pure fluid amplifier 22, the details of which will be discussed in connection with FIGURE 4.

As an aid in understanding FIGURE 1, it may here be mentioned that amplifier 22 generally includes an input duct 23 through which is introduced a fluid power jet stream from the high pressure side of a compressor into the center of the amplifier. In the absence of a control pressure signal introduced to the amplifier via the control duct 21, the power jet stream entering duct 23 exits from the amplifier via output duct 25 which returns the fluid passing therethrough to the low pressure side of the compressor. However, upon detector 20 producing a change in the control pressure response to a change in the infrared radiation thereon, the power jet stream is diverted into output duct 24 from whence it is utilized in a manner forming no part of the present invention.

In operation of FIGURE 1, it is assumed that relative motion exists between member 10 and the scanning infrared radiation beam formed by lens 15 and aperture 16. When no marking perforation 17 is directly in the path of said beam, it cannot impinge upon detector 20. Therefore detector 20 is exposed only to the ambient radiation which is insufficient to cause the system to respond. However, when the focused beam from source 14 impinges upon detector 20 via a marking perforation 17, it senses a substantial increase in its incident radiation and thus produces a change in the pressure of conduit 21 which is amplified by device 22 for use within the data processing system. Therefore, the pattern of marks on carrier member 10 is translated into a time sequence of pressure pulses from detector 20 which are subsequently amplified and utilized within a fluid data processing system.

Sources of infrared radiation 14 may be other than those described above. For example, carbon and other metallic arcs may be utilized, as well as non-metallic sources such as Nernst glowers and Welsbach mantles. Metallic sources generally create infrared radiation over a narrow spectrum while the latter sources have broad spectra. However, the Golay cell is responsive to infrared radiation of any wave length. For purposes of this application, infrared radiation is that radiation having a wave length longer than seven thousand Angstrom units (0.7 micron).

FIGURE 2 of the drawings illustrates an alternative embodiment of the invention for detecting perforations wherein the condensing lens and aperture on both sides of the carrier member are replaced by concave reflecting mirrors 33 and 34, respectively. Heat source 32 is provided whose infrared radiation is focused by mirror 33 to scan carrier member 30 for holes through which it is transmitted to impinge upon mirror 34 positioned on the opposite side. Mirror 34 collects this radiation and focuses same on detector 35 which is of the type described above in connection with FIGURE 1. The output from detector 35 is transmitted via duct 36 to the control input of fluid amplifier 37, with the function of detector 35 and amplifier 37 being the same as that previously described.

FIGURE 3 shows another embodiment of the present invention differing from those embodiments of FIGURE 1 and FIGURE 2. Here, the reader senses infrared radiation reflected from the position of a mark. Carrier member 45 provides the sub-base for one or more marks 46, each of which has an infrared radiation reflection coefficient different from that of member 45. In the preferred embodiment, the reflection coefficient of a mark is greater than that of carrier member 45. The scanning and detecting mechanism of the reader consists of a heat source 47 disposed on the side of member 45 holding marks 46, together with an optical mirror 48 positioned therebehind. Mirror 48 collects the rays of infrared radiation emitted from source 47 and produces a converging solid angle of radiation $\alpha$ whose apex is concentrated at a particular fixed point in the carrier member plane so as to scan the carrier member while it moves. A second optical mirror 49 and a detector 50 are positioned on the marked side of carrier member 45 at a location to receive any reflected rays of the incident infrared radiation due to the presence of a reflecting mark 46. A radiation shield or stop 56 may be interposed between heat source 47 and detector 50 to prevent radiation from the former to directly reach the latter. Optical mirror 49 collects the reflected radiation and focuses same upon the detector 50, whose operation in connection with a fluid amplifier 52 is the same as previously described in connection with FIGURES 1 and 2.

In operation, as a mark 46 moves into the scanning region of the concentrated beam from source 47, a substantial amount of the radiation is reflected therefrom which thereafter impinges upon detector 50 and causes a change in pressure of its enclosed fluid system. The changed output from detector 50 is amplified by unit 52 for use in the data processing system. However, detector 50 in the environment of FIGURE 3 must be more sensitive than the one used in the readers of FIGURES 1 and 2, since it operates on radiation scattered from the card rather than from radiation transmitted through holes. Only a small fraction of the radiation which falls on the area to be examined, i.e. a mark 46, is reflected within the divergent solid angle $\beta$ of mirror 49. A portion of the radiation will still be absorbed by the carrier member 45, while a portion will be scattered outside of the solid angle $\beta$. If the wave length of the scanning infrared radiation is approximately 10 microns, the following materials may be used as the marking media to provide reflection of more than 90% of the normal incident radiation: aluminum, cadmium, chromium, copper, or iron.

FIGURE 4 shows the details of a typical Golay cell 56, together with a fluid amplifier 57 connected to the output thereof to amplify the change in pressure generated by a change in the radiation incident thereon. Generally, detector 56, which is shown in section in FIGURE 4, comprises an infrared window 60 mounted in a plate 61 which is provided with a central bore 62 forming the outer part of the radiation absorbing cell 63. Plate 61 is also provided with a concentric recess used for housing a radiation absorbing film carrier 64, with the radiation absorbing film 65 being placed across a hemispherical recess 66 in carrier 64 to form the inner half of radiation absorbing cell 63. Carrier 64 is also provided with a bore 67 which matches a bore 68 in a conduit 71. Plate 61 and film carrier 64 are held in close mechanical engagement with respect to each other by threaded cap 70 to which is connected the conduit 71 leading to the control input of a fluid amplifier generally indicated by 57. The radiation absorbing membrane or film 65 consists of a collodion membrane made by the well-known water surface method. Further details of its composition and placement within the detector may be had by referring to the above identified Patent 2,557,096. Generally, its purpose is to absorb infrared radiation entering by way of window 60 so as to become heated thereby and transmit this heat to the gas or fluid which fills cell 63. The heated gas within cell 63 expands through the central bores 67 and 68 of the detector to duct 71, thereby leading to increased pressure therein.

Figure 5:
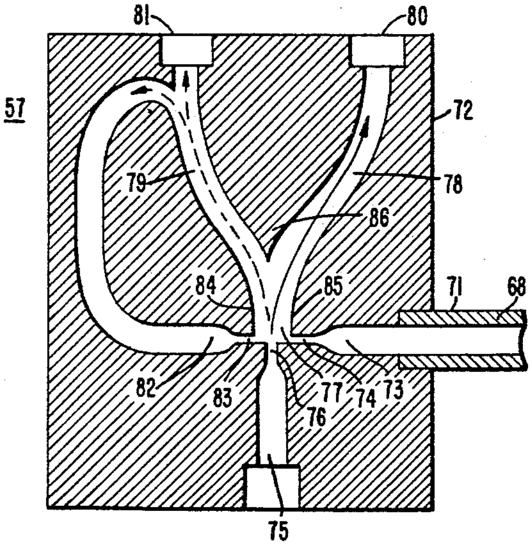
FIGURE 5 is a detailed sectional view of a typical pure fluid amplifier.

Pure fluid amplifier 57, whose details are more fully shown in FIGURE 5, comprises a solid body 72 having a plurality of fluid passageways through which the working fluid may flow. The working fluid may be either air or another gas, or water or another liquid, and is usually the same as that contained in cell 63 of detector 56. Although a sectional view of the amplifier is shown in FIGURE 5, it is to be understood that it is customary to mold or otherwise form the fluid passageways in one plastic laminate which is then covered on each side with solid plastic sheets so that the passageways are enclosed. A compressor or pump, not shown in any of the figures of the drawings, supplies a suitable regulated stream of fluid to the power input passageway 75. The power stream passes through a restrictive orifice 76 and emerges into chamber 77 as a high velocity jet stream. In practice the orifice may be extremely small and may for instance be less than 0.0025 square inch in cross section.

The chamber 77 is formed by the convergence of left output passageway 79 and right output passageway 78. The left wall 84 and the right wall 85 of the chamber are set back from the orifice 76 and, in accordance with Bernoulli's principle, the high velocity jet issuing from the orifice creates regions of low pressure adjacent to these walls. Within these regions of low pressure are layers of fluid which move at a much slower speed than the jet stream, hence these regions are referred to as boundary layers. By properly designing the chamber 77, these low pressure areas may be utilized to control the flow path of the jet issuing from the orifice 76.

In the example shown, this is accomplished in part by asymmetrically placing the body 86 so that the opening from the chamber into passageway 78 is greater than the opening from the chamber into passageway 79. Under these conditions, and assuming that there are no control signal inputs, the jet stream issuing from orifice 76 will tend to enter passageway 78 because of the lower pressure. As the jet stream moves into this passageway, it creates an even lower pressure in the region adjacent wall 85 and thereby "locks on" to this wall. This condition may be considered as the stable state wherein the power stream entering passageway 75 flows along a path as indicated by the solid arrow. Therefore, a stable condition exists in amplifier 57 when the fluid stream is locked on the wall 85, with the consequent result that fluid exits only from output 80 of passageway 78.

Two control signal input passages 73 and 82 are provided. Passage 73 is connected to duct 71 from detector 56 and exits into chamber 77 via orifice 74 positioned in wall 85. Passage 82 is derived from passageway 79 and exits into chamber 77 via orifice 83 located in wall 84. Both chambers are filled with the same fluid medium as used in the fluid system in general.

The operation of FIGURE 4 is as follows. In the absence of any change in radiation striking detector 56, it is assumed that the pressure existing in cell 63, and consequently in duct 71 and passage 73, is such that the fluid amplifier 57 is in its stable state. That is, the input power jet stream is locked onto wall 85 and passes through passageway 78 to output 80 of the amplifier. However, upon an increase in the radiation incident on detector 56, said radiation is absorbed by membrane 65 which in turn raises the temperature of the fluid to cause an increase in pressure in duct 71 and chamber 73 of the fluid amplifier. This increased pressure is transmitted through the fluid contained in chamber 73 and passes through orifice 74 into chamber 77 where it breaks or disperses the boundary layer and creates a condition of instability which tends to push the power stream into a direction away from wall 85. As the power stream is thus pushed to the left, it withdraws more and more molecules of fluid from the region adjacent wall 84 thus creating a low pressure region. The power stream thereupon moves into this low pressure region and locks onto wall 84, with the result being that the power stream now passes through passageway 79 to output 81. Assuming that output 81 is connected to further fluid amplifier logic circuitry not shown and not part of the present invention, the presence of an output here indicates to the data processing system that a mark has been detected upon the carrier member.

The increase in radiation incident on detector 56 is temporary due to the fact that the carrier member mark thereafter disappears from the field of the scanning beam. Therefore, upon reduction of the level of radiation to its original value, the pressure in cell 63, and consequently in duct 71, is reduced to its original quiescent value so that disturbance of the boundary layer at orifice 74 no longer occurs. However, inasmuch as the power jet stream is now locked onto wall 84, it will remain there until its boundary layer adjacent that wall is forceably broken by means next to be described. Upon initiation of the power jet stream flow in passageway 79, the increased pressure now evidenced therein is transmitted via passageway 82 back to orifice 83 located in wall 84. The arrival of the increased pressure at orifice 83 is delayed by a finite time interval because of the finite length of passage 82. When the increased pressure finally arrives at orifice 83, it interrupts the boundary layer of the power jet stream and thereby forces same back to its center path and into passageway 78 where it resumes its stable state. Therefore, fluid amplifier 57 is reset to its stable state subsequent to the detection of a mark on the carrier member in order to be ready for the amplification of a subsequent pressure pulse from detector 56.

In FIGURE 4, other infrared detectors of the pressure type may be used besides that specifically illustrated in the above identified Golay patent. Also, the working fluid in the detector and in the fluid amplifier may differ provided that they are separated by a suitably flexible membrane. Furthermore, pure fluid amplifiers utilizing different principles of operation may be employed in the present invention, e.g., the reset signal to passage 82 may be provided in other ways, or the fluid amplifier may be of the proportional type in which boundary layer attachment plays a minor role so that the amplifier output is approximately proportional to the amplifier input and thus no reset pulse is required. The advantage of the present marked card reader is that only a single transducer 56 need by utilized to convert the infrared radiation directly into an output pressure signal peculiarly adapted to operate an amplifier of the pure fluid type. Therefore, this invention results in a highly compact and mechanically rugged reading system with a minimum number of components.

It should also be appreciated from the foregoing that a plurality of detectors can be employed to simultaneously sense the same index position of each of a plurality of columns on a record bearing member. Inasmuch as there may be two or more holes contained in corresponding index points of different record columns, two or more detectors may respond simultaneously to the marks individual thereto. A linear arrangement of detectors may be extended by providing a two dimensional array of such detectors, which would be able to sample each index point of each column simultaneously without any necessity to move the record card. Thus, in practice the record bearing member does not necessarily require sensing hole by hole or even column by column, since the multiplicity of detectors in either a linear or matrix array may be sensitized by a single lens or mirror. Because of the fact that only one energy transducer is required per sensing position, there is a reduction in the size of a reader necessary for input to a fluid data processing system as compared to other reading devices for the same amount of information to be read. Conversely, the reader system of the present invention can accommodate increased information density occurring in the card length or area. These benefits are due, as before emphasized, to the fact that a fluid signal is directly obtainable from the use of an infrared radiation scan system together with a detector such as the Golay cell or the like.

Although several preferred embodiments of the invention have been shown and described herewith, it is apparent that many modifications may be made thereto by one skilled in the art. For example, in FIGURE 1 certain portions of the carrier member may be made of material transparent to infrared radiation. Also, in FIGURE 3 it is possible to reverse the relative values of the reflection coefficients of a mark and the carrier member so that absorption of the scanning beam by a mark causes a decrease in detector pressure output. Furthermore, relative motion between the carrier member and the scanning beam may be obtained by moving the source-detector assembly. Therefore, the scope of this invention is not to be limited except as defined by the appended claims.

I claim:

1. Apparatus for sensing the presence of a mark on a carrier member, where said mark is responsive to bombardment by radiant energy to produce a change in infrared radiation around said mark, said apparatus comprising: means to bombard said carrier member with radiant energy of the above described kind, and an infrared detector positioned adjacent said carrier member and responsive to a change in infrared radiation around a mark thereon of the type for producing a corresponding change in the pressure of an enclosed fluid system.

2. Apparatus according to claim 1 wherein said detector is of Golay type.

3. Apparatus for sensing the presence of a mark on a carrier member which comprises: a source of infrared radiation positioned adjacent said carrier member, an infrared detector of the type for producing a change in the pressure of an enclosed fluid system in response to a change in the infrared radiation incident thereon, said detector being positioned adjacent said carrier member to receive infrared radiation in a direction therefrom, and means to scan said carrier member with the infrared radiation from said source in a manner such that a change will occur in the infrared radiation incident on said detector only when a mark on said carrier member is in the scanning path.

4. Apparatus according to claim 3 wherein a mark positioned on said carrier member allows the transmission of infrared radiation therethrough, with said source and said detector being respectively positioned on opposite sides thereof so that infrared radiation from said source can reach said detector only by passing through a mark.

5. Apparatus according to claim 4 wherein said detector is of the Golay type.

6. Apparatus according to claim 4 wherein a mark is a perforation in said carrier member.

7. Apparatus according to claim 6 wherein said detector is of the Golay type.

8. Apparatus according to claim 3 wherein a mark on said carrier member has an infrared reflection coefficient differing from that of the carrier member, and said source and said detector are positioned on the side of said carrier member containing said mark, with said detector being exposed to infrared radiation reflected or scattered from said carrier member with a mark thereon.

9. Apparatus according to claim 8 wherein said detector is of the Golay type.

10. Apparatus according to claim 8 wherein said detector is shielded from direct or scattered radiation from said source except that reflected or scattered from said carrier member.

11. Apparatus according to claim 10 wherein said detector is of the Golay type.

12. Apparatus according to claim 8 wherein a mark on said carrier member has an infrared reflection coefficient greater than that of the carrier members.

13. Apparatus according to claim 12 wherein said detector is of the Golay type.

14. Apparatus according to claim 12 wherein said detector is shielded from direct view of said source.

15. Apparatus according to claim 14 wherein said detector is of the Golay type.

16. Apparatus for sensing the presence of a mark on a carrier member, where said mark is responsive to bombardment by radiant energy to produce a change in infrared radiation around said mark, said apparatus comprising: means to bombard said carrier member with energy of the above described kind, an infrared detector positioned adjacent said carrier member and responsive to a change in infrared radiation around the mark thereon which is of the type for producing a corresponding change in the pressure of an enclosed fluid system, and a pure fluid amplifier having at least one control input connected to the output of said detector such that the output of said fluid amplifier is changed upon a change of the infrared radiation incident on said detector.

17. Apparatus according to claim 16 wherein said detector is of the Golay type.

18. Apparatus for sensing the presence of a mark on a carrier member, which comprises; a source of infrared radiation positioned adjacent said carrier member, an infrared detector of the type for producing a change in the pressure of an enclosed fluid system in response to a change in the infrared radiation incident, thereon, said detector being positioned adjacent said carrier member to receive infrared radiation in a direction therefrom, a pure fluid amplifier having at least one control input connected to the output of said detector such that the output of said fluid amplifier is changed upon a change in the infrared radiation incident on said detector, and means to scan said carrier member with the infrared radiation from said source in a manner such that a change will occur in the infrared radiation incident on said detector only when a mark on said carrier member is in the scanning path.

19. Apparatus according to claim 18 wherein a mark positioned upon said carrier member allows the transmission of infrared radiation therethrough, with said source and said detector being respectively positioned on opposite sides thereof so that infrared radiation from said source can reach said detector only by passing through a mark.

20. Apparatus according to claim 19 wherein said detector is of the Golay type.

21. Apparatus according to claim 19 wherein a mark is a perforation in said carrier member.

22. Apparatus according to claim 21 wherein said detector is of the Golay type.

23. Apparatus according to claim 18 wherein a mark on said carrier member has an infrared reflection coefficient differing from that of the carrier member, and said source and said detector are both positioned on the side of said carrier member containing said mark, with said detector being exposed to infrared radiation reflected or scattered from said carrier member with a mark thereon.

24. Apparatus according to claim 23 wherein said detector is of the Golay type.

25. Apparatus according to claim 23 wherein said detector is shielded from direct or scattered radiation from said source, except that reflected or scattered from said carrier member.

26. Apparatus according to claim 25 wherein said detector is of the Golay type.

27. Apparatus according to claim 23 wherein a mark on said carrier member has an infrared reflection coefficient greater than that of the carrier member.

28. Apparatus according to claim 27 wherein said detector is of the Golay type.

29. Apparatus according to claim 27 wherein said detector is shielded from direct view of said source.

30. Apparatus according to claim 29 wherein said detector is of the Golay type.

References Cited by the Examiner

UNITED STATES PATENTS

| | | | |
|---|---|---|---|
| 2,424,976 | 8/47 | Golay et al. | 250—83 |
| 2,704,634 | 3/55 | Rauch | 250—71 |
| 2,742,631 | 4/56 | Rajchman et al. | 250—71 |
| 2,756,343 | 7/56 | Johnson | 250—71 |
| 2,888,570 | 5/59 | Toulmin | 250—52 |
| 2,944,156 | 7/60 | Davy et al. | |
| 3,017,512 | 1/62 | Wolbert. | |

RALPH G. NILSON, *Primary Examiner.*

ARCHIE R. BORCHELT, *Examiner.*